United States Patent
Bjorkdahl

[11] Patent Number: 6,082,015
[45] Date of Patent: *Jul. 4, 2000

[54] BALL GAUGE

[76] Inventor: Rolf Bjorkdahl, Sira Helgas gata 11, S-451 75, Uddevalla, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,732

[22] PCT Filed: Apr. 23, 1996

[86] PCT No.: PCT/SE96/00529

§ 371 Date: Oct. 28, 1997

§ 102(e) Date: Oct. 28, 1997

[87] PCT Pub. No.: WO96/33780

PCT Pub. Date: Oct. 31, 1996

[30] Foreign Application Priority Data

Apr. 28, 1995 [SE] Sweden ................................. 9501578

[51] Int. Cl.[7] ................................ G01B 3/34; G01B 5/22

[52] U.S. Cl. ............................... 33/555.2; 33/501; 33/508

[58] Field of Search ............................... 33/501, 508, 509, 33/555.1, 555.2, 555.4

[56] References Cited

U.S. PATENT DOCUMENTS

| | | | |
|---|---|---|---|
| 3,310,879 | 3/1967 | Brzezinski et al. | 33/555.2 |
| 3,512,262 | 5/1970 | Smyk et al. | 33/555.2 |
| 3,574,260 | 4/1971 | Smyk | 33/501 |
| 3,665,757 | 5/1972 | Hoag | 33/501 |
| 3,797,123 | 3/1974 | Frahley | 33/555.1 |
| 3,828,442 | 8/1974 | Bernard | 33/555.2 |
| 4,385,447 | 5/1983 | Bennett | 33/555.1 |
| 4,528,759 | 7/1985 | Joyce et al. | 33/508 |
| 5,401,019 | 3/1995 | Wissman et al. | 33/555.2 |
| 5,774,997 | 7/1998 | Gruen, Jr. | 33/555.1 |

FOREIGN PATENT DOCUMENTS

| | | | |
|---|---|---|---|
| 750934 | 5/1943 | Germany | 33/555.1 |
| 1575068 | 6/1990 | U.S.S.R. | 33/555.1 |

*Primary Examiner*—G. Bradley Bennett
*Attorney, Agent, or Firm*—Dvorak & Orum

[57] ABSTRACT

The invention relates to an arrangement (1) for checking the quality of balls (2) in respect of their diameter (D) and any damage to their periphery (3), in particular intended for checking golf balls (2). A diameter gauge device (4) extending along at least part of the diameter (D) of an aforementioned ball is situated at a distance from a bottom support (5) so arranged as to support a ball (2) accommodated in the arrangement (1) for checking.

9 Claims, 3 Drawing Sheets

BALL GAUGE

The present invention relates to an arrangement for checking the quality of balls in respect of their diameter and any damage to their periphery, in particular intended for checking golf balls, by means of a diameter gauge device extending along at least part of the diameter of an intended ball, which device is situated at a distance from a bottom support so arranged as to 'support a ball accommodated in the arrangement for checking, in conjunction with which the diameter gauge device is formed by a ring extending around the entire periphery of the ball at its diameter.

Playing golf with damaged balls which do not exhibit fully round form or which have damage to the outer covering can cause problems for golf players, especially when playing on the green requiring putting of the ball. Arrangements for checking golf balls are already available, although they comprise a complex and costly construction which is not suitable for carrying around the course and are permanently located in the golf shop or at some other point on the course. This comprises a tube in which the ball is raised and rotated on a stand.

Previously disclosed arrangements for checking balls in accordance with U.S. Pat. No. 3,574,260, U.S. Pat. No. 3,797,123 and U.S. Pat. No. 4,528,759 comprise a frame in which the ball is accommodated as the diameter and quality of the ball are checked, in conjunction with which its walls are closed, which is associated with the disadvantage that it is not possible to see whether the ball makes proper contact with the bottom support inside it, or whether the ball is hanging in the air. Given that it is not known for certain whether the ball travels all the way down to and rests on the bottom support, because one cannot see the bottom support which is obscured by the ball when the ball is accommodated in the arrangement for checking, the aforementioned ball checking arrangements do not function satisfactorily. There is the risk of believing that the tester is checking the ball diameter without actually doing so if the ball remains caught on the ring that is to check the ball diameter.

If one inserts a ball which is round, but which exhibits poor tolerance and is a little too large, the ball will not fall completely down into the checking arrangement, and the ball can still rotate. In this case the diameter gauge device ends up beneath the diameter of the ball, which means that the actual diameter of the ball is not checked. The test arrangement thus loses its intended function.

The principal object of the present invention is thus, in the first instance, to solve the aforementioned problems by simple and effective means and to permit golfers to carry the ball tester with them around the course to enable them to test their balls all the time and to see whether they have been damaged in any way, for example residual damage following hard impacts resulting in the ball not being fully round, or whether damage has occurred to the outer covering.

The aforementioned object is achieved by means of an arrangement in accordance with the present invention, which is characterized essentially in that the actual bottom support for a ball is formed on the inward-facing smooth surface of a bridging device in the form of a curved arch extending between at least two points on the ring.

The invention is described below as a number of preferred illustrative embodiments with reference to a number of accompanying drawing figures, in which FIGS. 1 and 2 show a first illustrative embodiment, in which FIG. 1 shows the test arrangement in perspective viewed at an angle from above with a ball in the test position;

Figure 1:
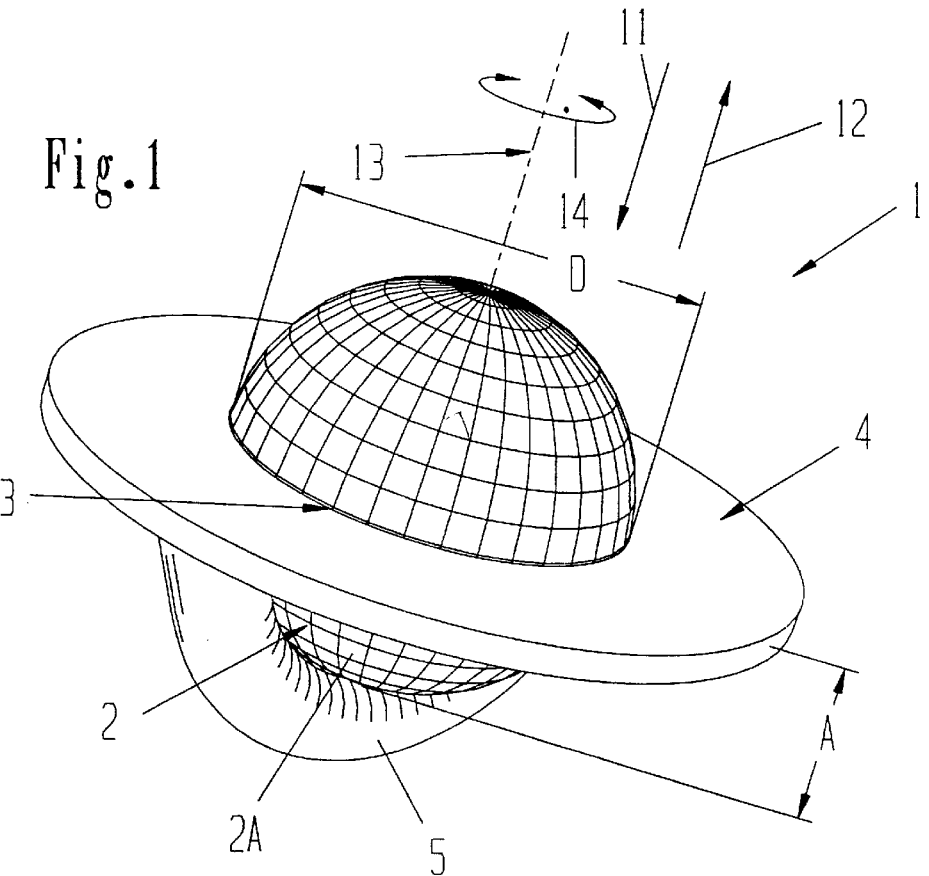

An arrangement 1 for permitting easy checking of the quality of balls 2, in particular golf balls, in respect of the diameter D of the balls 2, and of the presence of any surface damage to the outer covering 2A of the balls around their periphery 3, comprises in accordance with the present invention a diameter gauge device 4 extending for at least part of the diameter D of an intended ball. The aforementioned diameter gauge device 4 is situated at a distance A from a bottom support 5 which is so arranged as to support a ball 2 accommodated in the arrangement 1 for checking.

The aforementioned diameter gauge device 4 is formed by a ring extending around the entire periphery 3 of the ball at its diameter D.

The test arrangement 1 is preferably manufactured from metal material, although other materials such as plastics are naturally not excluded.

The bottom support is also formed by a bridging device 5 extending between at least two points 6, 7 on the ring 4. The aforementioned bridging device 5 is in the form of an arch.

Figure 3:
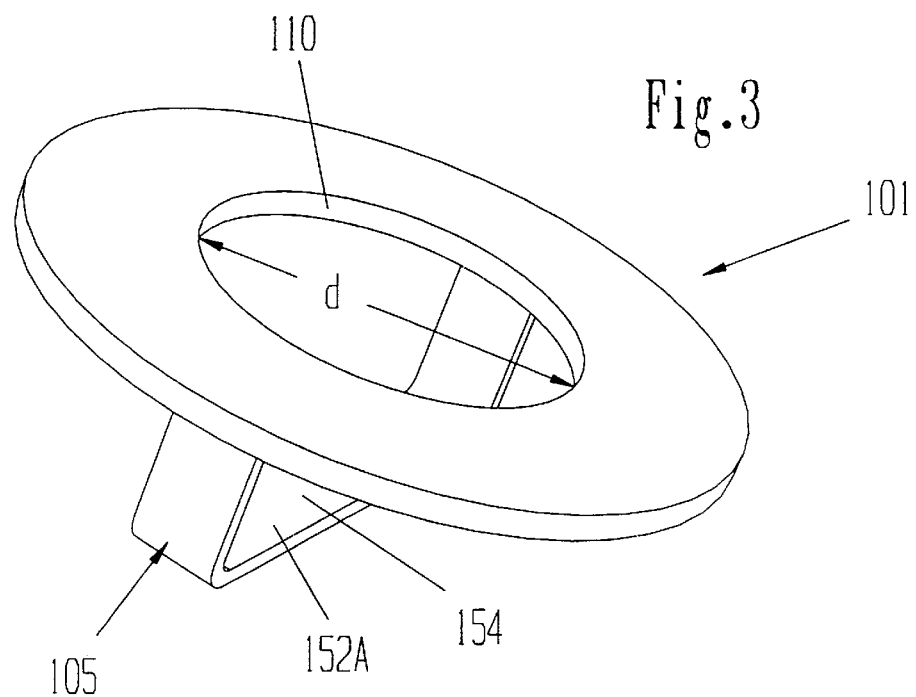
FIGS. 3 and 4 show a second illustrative embodiment of a test arrangement in the empty position viewed at an angle respectively from above and from below.
Figure 4:
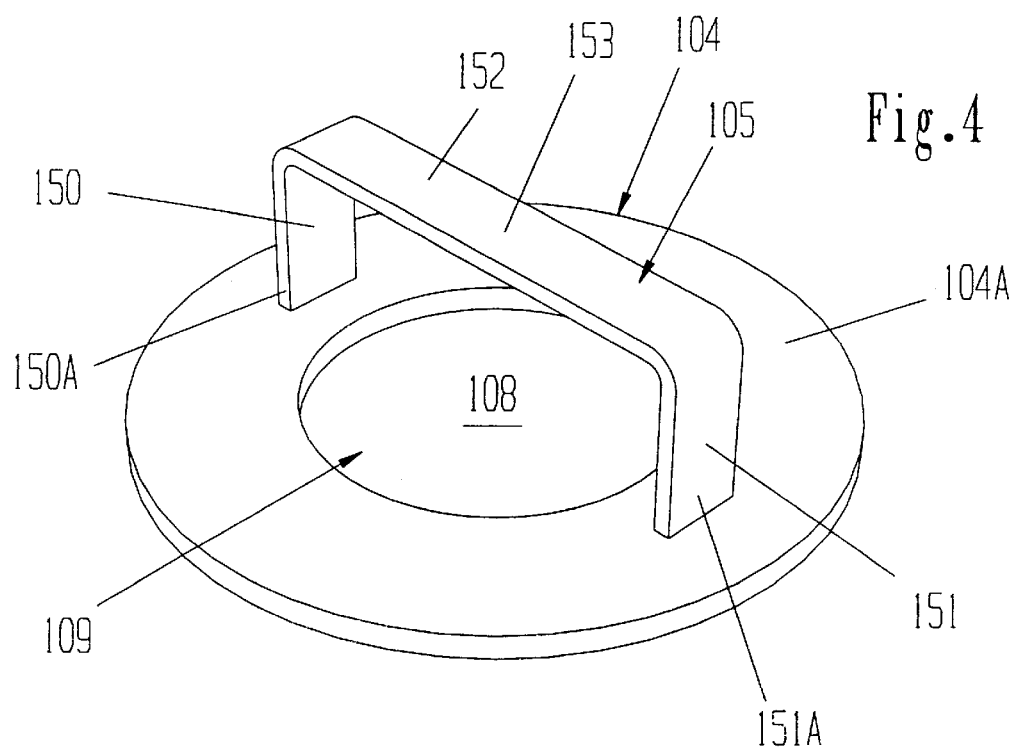
Figure 5:
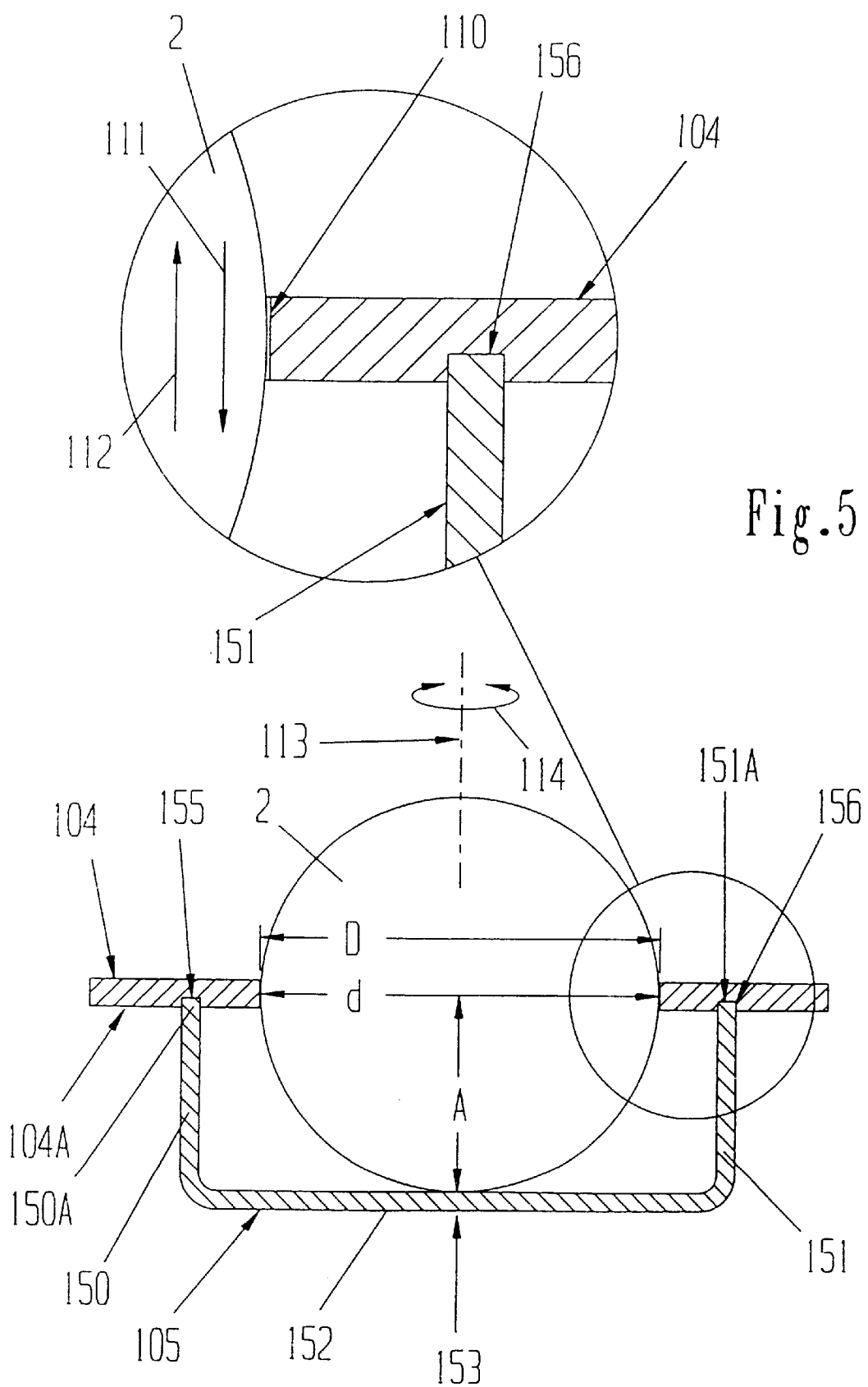
FIG. 5 shows a cross-section through the test arrangement in the test position, with an enlarged part illustrating the interaction between a ball and the test arrangement.

In accordance with the illustrative embodiment of a checking arrangement 101 of the kind shown in FIGS. 3–5, the aforementioned arch 105 has two essentially parallel legs 150, 151, each of which projects with its one respective end 150A, 151A attached to the ring 104 on its underside 104A. The arch 105 has a preferably straight shank 152 connecting both the aforementioned legs 150, 151, at the middle 153 of which shank the ball-accommodating actual bottom support 154 for a ball 2 is formed on the inward-facing surface 152A of the ball shank 152.

Both the ring 104 and the arch 105 are preferably of rectangular cross-section, namely of rectangular form.

In order to permit simple and effective attachment to the components to one another, the legs 150, 151 of the arch 105 may be capable of being accommodated by their ends 150A, 151A in matching recesses 155, 156 in the ring 104 on its underside 104A and attached thereto through a thermal effect, e.g. cooling and/or heating of the components 104, 150, 151.

Figure 2:
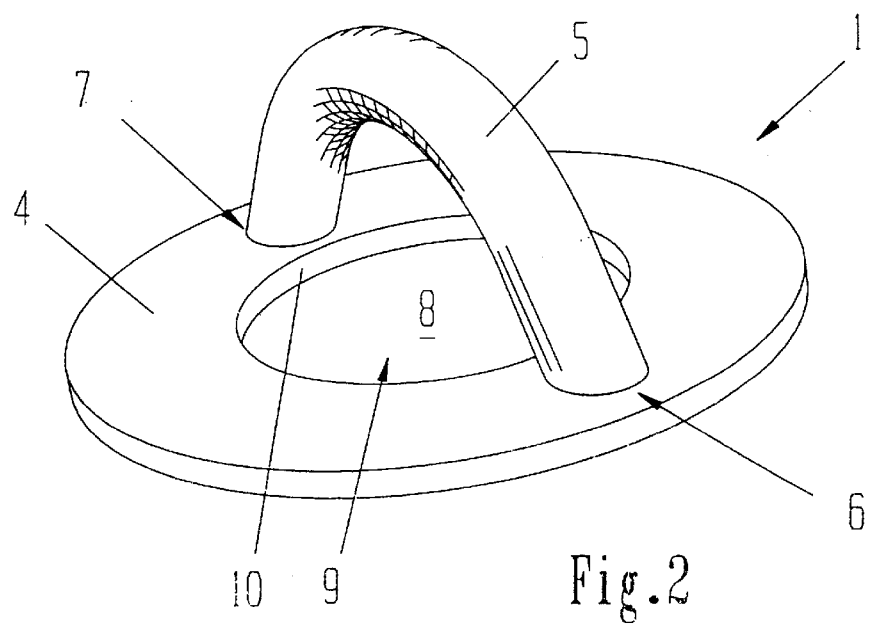
FIG. 2 shows the test arrangement in the empty position from below.

Illustrated in FIGS. 1 and 2 are examples of a checking arrangement 1 in which the arch 5 is curved and is attached to the circular ring 4.

Both the ring 4 and the arch 5 preferably extend in a circular fashion.

The distance A between the bottom support 5; 105 for the ball 2 at the centre 8; 108 of the ring is essentially the same as the radius of a ball.

Internally within the ring 4, 104 is a ball-accommodating hole 9, 109. This hole 9, 109 has a diameter d which essentially corresponds to the diameter D of a ball. The edge 10, 110 of the aforementioned hole 9, 109 is essentially straight viewed in the direction of insertion 11; 111 and the direction of removal 12; 112 of the ball.

Simple checking is achieved in this way by means of the arrangement 1, 101 by pushing the ball 2 into the hole 9, 109 so that it drops down against the bottom support 5, 105 and is supported by it. The fact that the diameter of the ball 2 aligns directly with the centre of the inward-facing edge 10; 110 of the ring 4, 104 means that, when the ball 2 is rotated in the arrangement about its upward-facing central axis 13, 113 in the direction 14, 114, any defects, such as a variation in diameter, can be easily checked. Defects in balls 2 can also be checked easily by rotating the ball 2 in another direction of rotation.

The invention is not restricted to the illustrative examples described above and shown in the drawings, but may be modified within the scope of the Patent Claims without departing from the idea of invention.

What is claimed is:

1. A sphericity device for evaluating the quality of a golf ball with respect to its diameter and for detecting damage to its periphery comprising:

a ring having a first side corresponding to an upper surface, a second side corresponding to an underside surface, and a centralized hole of a diameter slightly greater than the standard diameter of a golf ball, said hole defined by an inside edge extending between said upper and underside surfaces, said inside edge including a midpoint thereon;

a bridging device extending across said hole only between two diametrically located points on one of the upper and the underside surfaces of said ring, said bridging device including an inward-facing surface which acts as a support for a golf ball placed in the hole of said ring, wherein said inward-facing surface is positioned relative to one of said upper and underside surfaces of said ring such that a distance between inward-facing surface of the bridging device and the midpoint of the inside edge is equal to a radius of the ball, whereby said golf ball may be manipulated from either side of said ring so as to rotate the ball about various axes thereof to check ball sphericity by the consistency or variance in distance between the inside edge and the periphery of the ball.

2. The device according to claim 1 wherein said bridging device has a cylindrical shape.

3. The device according to claim 1 wherein a distance between the inward-facing surface of the bridging device and a center of the ring is equal to a radius of the ball.

4. The device according to claim 1 wherein the inside edge of said ring is straight when viewed in the direction of insertion or removal of the ball.

5. The device according to claim 2 wherein a distance between the inward-facing surface of the bridging device and a center of the ring is equal to a radius of the ball.

6. The device according to claim 3 wherein said bridging device comprises two parallel legs each having a first end and a second end respectively, and a shank, each first end of said parallel legs is connected to said shank, and each second end of said parallel legs is connected to said ring.

7. The device according to claim 4 wherein said bridging device comprises two parallel legs each having a first end and a second end respectively, and a shank, each first end of said parallel legs is connected to said shank, and each second end of said parallel legs is connected to said ring.

8. The device according to claim 3 wherein said bridging device and said ring each have a rectangular cross section.

9. The device according to claim 3 wherein said ring further comprises two recesses in said underside surface of said ring, one of the second end of said parallel legs is inserted into each of said recesses.

* * * * *